Feb. 12, 1952 W. F. MOORE 2,585,573
VARIABLE FREQUENCY POWER SUPPLY SYSTEM
Filed Oct. 29, 1948

Inventor
Willis F. Moore

Patented Feb. 12, 1952

2,585,573

UNITED STATES PATENT OFFICE 2,585,573

VARIABLE FREQUENCY POWER SUPPLY SYSTEM

Willis F. Moore, Springfield, Vt., assignor to Bryant Chucking Grinder Company, Springfield, Vt., a corporation of Vermont Application October 29, 1948, Serial No. 57,237

9 Claims. (Cl. 318—231)

The present invention relates to variable-frequency power supply systems for industrial electric motors and the like, whereby the speed of operation may be controlled.

It is a primary object of the invention, to provide an improved power supply system of the type referred to, the power output of which is adapted to meet relatively heavy load conditions wholly through electronic tube means, and the output frequency of which is variable over a relatively wide range representing relatively high motor speeds in connection with alternating current motors of the induction type.

Known inverter type and other electronic tube power supply systems have power output and frequency range limitations which heretofore have prevented the wide use of variable-frequency speed control of the above and similar motors, except through the use of rotating variable speed generators and the like. It is therefore, a further object of this invention, to provide an improved variable-frequency power supply system of the electronic tube type which provides one or more relatively wide frequency variation ranges, with a high degree of stability at any frequency within the said operating ranges, a relatively high range of power output available for the operation of high speed alternating current motors in machine tools and the like, and an extended operating life for the electronic tube means utilized therein, all of which, known prior devices have in part or wholly, been unable to provide.

An efficient variable-frequency power supply system of the electronic tube type embodying the invention, has been sought by the machine tool industry and by the wood-working industry, for example, to provide an efficient high speed motor drive for various tools and tool elements, such as grinding wheels, cutters, and the like, and to attain certain required high working speeds with direct drive. While the electric motor in certain of its forms, is adapted to meet speed demands satisfactorily, and is likewise adapted to provide flexibility in speed control, the machine tool industry in general has been confronted with the problem of meeting demands for higher speeds and for greater flexibility in speed control and wider speed range in connection with operation of certain tools or tool elements, particularly in the above applications.

A direct current drive by means of known forms of variable speed motors and circuits, as well as the use of alternating current, commutator-type wound-rotor motors and circuits is satisfactory for operational speeds up to certain limits, above which the squirrel-cage induction motor, by reason of its simple rotor element, is much better adapted for the high degree of dynamic and static balance required. The induction motor, however, is normally limited to certain stepped speed changes represented by known arrangements for changing the number of poles thereby to adjust the speed in fixed steps.

In developing high speed drive systems for machines and machine elements, belting, gearing, friction drives, and the like between an electric motor and a high speed working spindle are also not satisfactory or practical above certain speeds, because of obvious mechanical limitations. In wood and metal working machinery, particularly in abrading and grinding machinery, the present trend is to higher tool spindle speeds than are practical for the application of any of the above forms of drive. While a grinder spindle, for example, driven by a belt may work satisfactorily up to speeds of the order of 35,000 R. P. M. and possibly higher, the efficiency is not all that could be desired, and in an effort to eliminate the high speed belt drive and other forms of power transmitting means between the motor and the high-speed spindle, both the motor spindle and the tool spindle have been joined directly, thereby requiring higher motor speeds than have commonly been the practice. For high speed direct drives, a D. C. or A. C. wound-rotor type motor is therefore, immediately eliminated as a possibility for the power source because of commutating difficulties and other design complications, including the risk of unbalance at the high speeds involved.

For the high speed direct drive of tool spindles in machine tools, woodworking machinery and the like, in accordance with the invention, the squirrel-cage induction motor is at present preferred, being adapted for rugged design and having a rotor which makes high speed direct drive possible both from mechanical as well as electrical considerations. The rotor may be considered practically as a simple shaft element, as it includes only a few conductor bars which may be brazed or welded in place, and the whole rotating element may thus be designed for good static and dynamic balance and for the least wind resistance at high speeds, which is an important characteristic to be considered. In addition, the motor is adapted to give long operating life without attention, by reason of its simple rotor structure, and the latter tends to retain its dynamic balance throughout a long operating life.

By utilizing a two-pole induction motor, a speed of 36,000 R. P. M. may be obtained with a supply frequency of 600 cycles. With the demand for higher work spindle speeds, power at higher supply frequencies must be made available. For example in the machine tool industry, present speed requirements for small grinding wheels may be based upon a surface speed well above 5,000 feet per minute, and therefore, on the basis of 5,000 feet per minute, it is found that a one-inch diameter wheel should run approximately 19,000 R. P. M. Likewise, a one-quarter inch diameter wheel must run substantially 76,000 R. P. M. to attain the required surface speed.

Considering even smaller grinding wheels, such as one-eighth inch diameter wheel, it will be seen that to maintain the assumed surface speed for efficient grinding, speeds well above 150,000 R. P. M. must be obtained at the spindle. With a direct-connected induction motor having two poles, this makes the power supply problem even more difficult, since a considerable amount of power must be provided at the high frequency required, and it is further desired that this frequency be variable over a wide range to adjust the spindle speed in accordance with the diameter of the particular grinding or cutting tool attached thereto, and the other requirements of the work load.

It will be seen that a required supply frequency for powering such tool and like spindles may thus exceed 3,000 cycles. This frequency would be suitable for supplying a two-pole induction motor at substantially 180,000 R. P. M., for example. For the power supply of direct coupled motors for such tool spindle speeds, it will also be seen that rotary converters and motor generators heretofore used are no longer practical, since they in turn present design and operating problems in that they must operate at higher speeds. In addition, there are operational noise and maintenance problems as well as the problem of additional cost, which prevents their consideration for the supply of power at the high speeds above considered. Furthermore, it must be considered that the efficiency of such high speed and high frequency rotary power supply means tends to decrease with an increase in the frequency requirement.

It is necessary, therefore, to eliminate the use of rotating frequency changer or generator means for the high frequency power supply of presently considered high speed electric motor driven machine tools and the like, and to consider electronic tube means which provide extreme flexibility of design, particularly with regard to the output frequency requirement, without the use of any rotating or movable parts or elements. However, the problem of providing an infinitely variable range of frequencies which may fulfill the need for flexibility in the control and variation of operating speeds, while at the same time providing adequate power, has heretofore presented problems which have not been solved satisfactorily.

It is, therefore, a still further object of this invention to provide an improved electronic-tube variable-frequency power supply system for high speed induction motors and the like, for the direct operation of machine tool spindles, which provides a frequency variation range corresponding to a full range of required speed variations, with adequate power, including a range of operating speeds which may extend from relatively low values to values of the order of 180,000 R. P. M. and higher.

It will be appreciated that this requires the production of considerable power through electronic tube means at frequencies ranging up to and above 3,000 cycles per second.

It is also a related object of the invention, to provide an improved electronic tube variable frequency power supply system of the industrial motor control type, which may have relatively small physical dimensions and a simple and efficient circuit arrangement adapted to be manufactured at low cost, and which in operation is subject to minimum maintenance costs and provides relatively long tube life, particularly of the power output tubes.

As hereinbefore indicated, for the purposes intended, it is necessary to provide not only a single high frequency, with adequate power, but to provide a widely variable output frequency while at the same time maintaining the necessary power output for driving a tool spindle at high speeds under various load conditions.

It is, therefore, a further object of the invention, to provide a variable frequency type of power supply system for high speed motor operation and the like, which is adapted for substantially an infinite speed variation range with adequate power to meet the demands of the work load in high-speed industrial equipment, such as machine tools, woodworking equipment and the like.

As stated hereinbefore, it is contemplated, in accordance with the invention, that the power utilizing means in a complete system of the type referred to shall be a squirrel-cage induction motor or the like, which in itself is not adapted for speed variation except by changing the number of poles. For this reason, and for attaining the highest possible speed with lowest frequency output, it is preferable that the motor be a two-pole motor. The number of poles may be increased however to provide lower speeds with a given power supply system. For example, a two-pole motor operating at a mean speed of 90,000 R. P. M. may be changed to a four-pole motor for operating at a mean speed of 45,000 R. P. M. with the same power supply system where the speed range is the same percentage of the maximum. However, in accordance with the invention, such speed changes are best attained by variation of suitable control elements in the power supply system without the necessity for changing the motor poles.

It is also an object of the invention, therefore, to provide an improved speed control system for high speed motors, particularly of the alternating-current squirrel-cage induction type, for directly driving high speed machine tool elements such as tool spindles and the like, which is not only effective at relatively low power levels and speeds, but which is highly effective and efficient for variable speed control in the higher speed ranges, for example, above 100,000 R. P. M., and with adequate power to meet the demand of the work load in any particular application, in the fields indicated.

A variable frequency power supply system in accordance with the invention includes an effective electronic tube power circuit and frequency control means therefore providing for the elimination of mechanical speed change devices, gear trains and the like, in driving high speed shafts or tool spindles by electric motor means with variable speed control.

The problem of speed control is further simplified since the frequency of the power input to a squirrel cage induction motor may by this means, be varied over a relatively wide range, thereby providing a speed variation which is substantially in direct proportion to the frequency variation. It is therefore obvious that this gain in flexibility is of great value in connection with the powering of machine tools such as lathes, milling machines, or high speed grinders, or in connection with various forms of woodworking machinery requiring high speed cutters and other rotary tool elements for processing the work. In any case, however, flexible speed variation and stable operation at various speeds are provided thereby for any application of power to the work or tool spindles of such industrial machinery.

In accordance with the invention, furthermore, the variable-frequency power-supply system above may comprise a variable frequency oscillator, operative over a relatively wide band of frequencies, as a speed controlling frequency source, a suitable amplifying system for the voltage output of the oscillator, and a power amplifier or power controlling circuit gated or triggered by the amplified oscillator voltage to deliver power at the predetermined oscillator frequency to the motor load or other utilization means coupled to the output of the power controlling circuit. In addition, a simplified rectified power supply system is provided in connection with the power controlling circuit to energize the load therethrough. A variable pulse source may be provided in place of the oscillator.

Further in accordance with the invention, rectified or other substantially ripple-free D.-C. power is converted into A.-C. power under control of a variable frequency oscillator, through the medium of a push-pull connected electronic tube power circuit arranged as the output stage of the speed control system. This includes two grid-controlled hot-cathode gaseous discharge tubes or gas triodes commonly known as thyratrons. As is well known, such tubes are employed to control relatively heavy unidirectional current flow and operate in response to the application of a positive potential to the anode, while the control grid is brought to a predetermined potential in a positive direction, at which potential the tube conducts or fires. The more negative the control grid is made in relation to the cathode, the higher is the anode potential required to cause the tube to fire or conduct. The tube becomes de-ionized and again non-conducting when the anode potential falls below the de-ionizing potential and the control grid potential is simultaneously reduced in the negative direction, to a predetermined low value. Firing does not then take place when the anode potential is again brought to full value.

It is still another and important object of the invention, to provide an improved method and circuit means for operating a pair of grid-controlled, gaseous-discharge electron-tube devices, or thyratrons, effectively as A.-C. power producing means in the output end of a variable frequency power supply system in connection with a power output transformer, and at output frequencies far in excess of the maximum rate considered practicable for proper de-ionizing action with tubes of that type, whereby the power handling capabilities of such tubes may be utilized in supplying variable frequency A.-C. power at frequencies representing desired high speeds in industrial motor applications and the like.

It is also an object of the invention, to provide an improved power controlling circuit embodying electronic tubes of the above gaseous-discharge type which operates effectively to control or limit the peak load current through said tubes in a push-pull power output stage for the system, without limiting the useful power output therefrom.

To this end, a direct current power supply circuit is provided in connection with such push-pull power stage employing gaseous-discharge type electronic tubes which embodies impedance means, including a current controlling resistor and a current controlling inductance element for establishing an operating condition which has been found to give long tube life without impairing the effectiveness of the system as a power supply means, and thereby overcomes an operational difficulty which has heretofore prevented the full use of such tubes in the control of alternating current power from a direct current source with any degree of efficiency or economy of operation.

It has been found that whereas, in accordance with the invention, any variable frequency source of controlling or gating potential may be utilized in connection with the gaseous-discharge electron-tube power output stage of the thyratron type above referred to, a resistance-capacitance variable frequency oscillator is best adapted for the wide frequency range required, considering its circuit simplicity and operational stability. Such an oscillator may be of the Wien bridge type, for example, the frequency variation and adjustment of which is controlled by variation of resistance and capacitance elements in a bridge feedback circuit therein. A wide range of controlling frequencies with a minimum number of electronic tubes may be obtained thereby and such a circuit has obvious advantages including low manufacturing cost. However, a variable pulse source may be used to gate or trigger the power control stage to effect the variable frequency power output from the system. The oscillator thus represents any gate pulse producing means for triggering the push-pull circuit.

For the effective application of power at variable frequencies to high speed motor means in connection with machine tools and the like, ease of operation and control, as well as size and efficiency, must be considered. Accordingly, it is a still further, and important, object of this invention, to provide an improved and simplified electronic power supply system for the variable speed control of high speed A.-C. induction motors and the like, which requires a minimum number of operating and speed control elements and which includes simple and effective power supply means, and a control system including safety features as a part thereof, while at the same time being adapted to be contained in a relatively small space for attachment to or inclusion in a machine tool or other industrial machine with which it is to be used. Therefore, further in accordance with the invention, a simplified and effective three-phase power circuit and control system preferably may be incorporated in the equipment for applying and controlling power for operation of the electric motor means. D.-C. power is gated at a variable frequency through the gaseous discharge tube or power output stage of the variable speed system, the D.-C. current requiring a minimum of filtering while providing maximum power under control of a minimum number of control elements and with a minimum number of control circuits. The apparatus is thereby simplified and reduced in cost, while being relatively easy to maintain effectively in service, as is required in connection with machine tools and the like.

The invention will further be understood from the following description, when considered in connection with the accompanying drawing, and its scope will be pointed out in the appended claims.

In the drawing, the figure is a schematic circuit diagram of an electronic tube variable-frequency power supply system embodying the invention.

Figure 1:
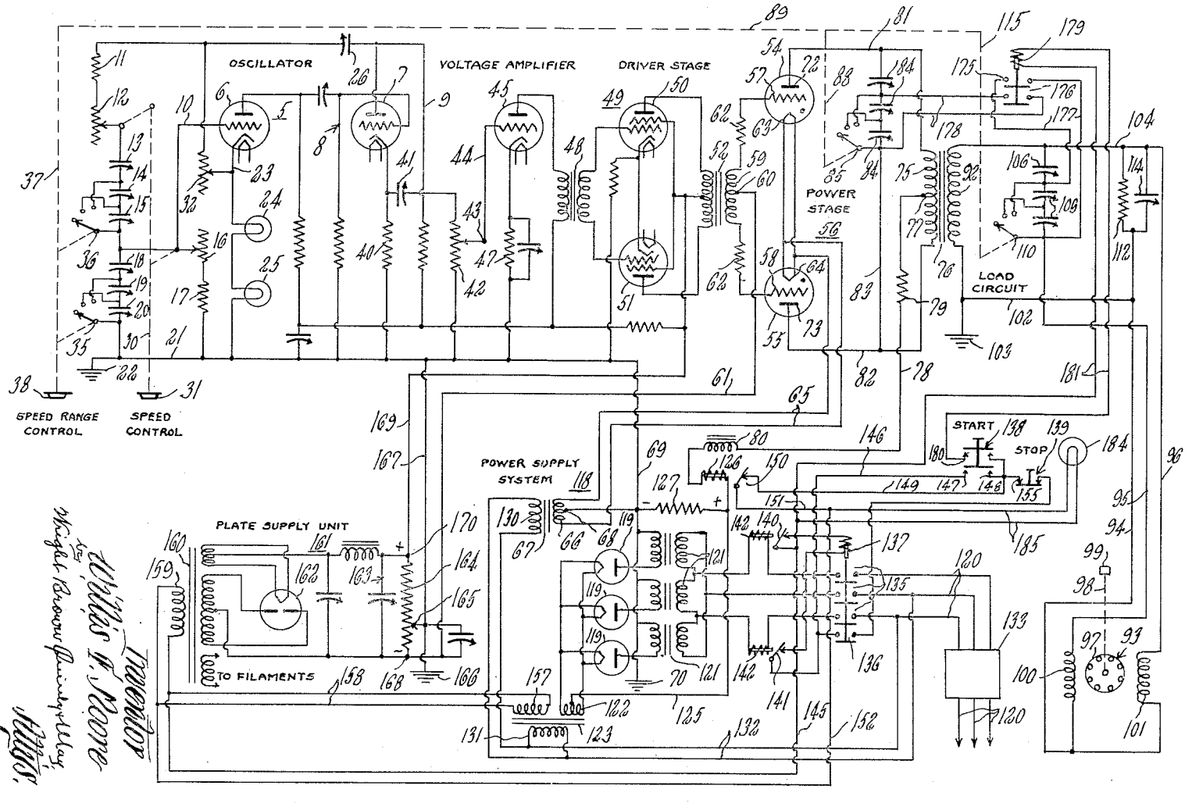

Referring to the drawing, a variable frequency oscillator 5, of the resistance-capacitance type, is provided as a variable frequency or gate pulse source, having a relatively wide frequency variation range and a high degree of stability at all frequencies. For this purpose, a Wien bridge oscillator circuit is provided in the present example, utilizing a resistance-capacitance bridge feedback network in connection with two electronic tubes 6 and 7, which may each be one-half of an electronic tube known commercially as a 6SN7-GT type, or any similar dual triode tube with indirectly heated cathodes, as shown. The tube 6 is the oscillator tube, and the tube 7 acts as an amplifier and phase inverter, being impedance-coupled to the oscillator tube 6, as indicated, through a well known form of resistance coupling network 8.

The anode circuit 9 of the amplifier tube 7 is coupled back to the grid circuit 10 of the oscillator through a series resistance-capacitance network comprising a fixed series resistance element 11 and a variable series resistance element 12, in turn in series with fixed capacitors 13, 14 and 15. The grid circuit 10 of the oscillator is further connected with a shunt resistance-capacitance network comprising variable and fixed resistors 16 and 17 in series and connected across a capacitor section thereof comprising three series capacitors 18, 19 and 20. The grid circuit is connected through the resistors 16 and 17 to the ground return circuit 21 for the system, which is connected to chassis or ground as indicated at 22.

The cathode circuit 23 of the oscillator tube is likewise connected to ground through a pair of thermistors or current responsive variable resistance elements 24 and 25, which may be provided by the filaments of suitable miniature incandescent lamps of 115-volt, 6-watt capacity. It will also be noted that a blocking capacitor 23 is provided between the anode circuit 9 and the feedback circuit to prevent the application of the anode potentials to the cathode and grid circuits through the feedback circuit resistors.

In accordance with the usual practice, the fixed series resistors 11 and 17 are equal, and likewise the variable resistors 12 and 16 are equal, the latter being connected mechanically for operation simultaneously, as indicated by the dotted line 30, which terminates in a speed control knob indicated at 31. This may be a suitable manually operable dial arrangement for moving the variable controls on resistors 12 and 16 simultaneously, to increase or decrease the resistance in circuit, thereby to vary the frequency of the oscillator. This control is operative on the positive feedback loop to the grid circuit from the anode circuit 9.

Negative feedback to the cathode is provided through a circuit across the lamps 24 and 25 and a series variable resistor 32, connected through the blocking capacitor 26 with the anode circuit. The variable resistor is adjusted to control the amplitude of the oscillations or gating pulses derived from the variable frequency source.

Likewise, the frequency range through which the variable speed control element 31 is effective may be adjusted by means of the capacitors 13—15 and 18—20, through range switching means provided by tap switches 35 and 36, connected in circuit therewith, to permit the three capacitors in each group to be connected in series or successively removed from circuit in three steps, finally retaining capacitors 13 and 18 in circuit, the arrangement being such that the effective capacity in circuit is increased to a maximum when the capacitors 13 and 18 alone are effective, and is decreased to a minimum when all three capacitors in each element of the circuit are effectively in series. The switches 35 and 36 are mechanically interconnected for simultaneous operation in predetermined relation, as indicated by the dotted connection 37, terminating in a control knob 38 by which the switching means may manually be operated to any one of the three positions indicated, as a speed range control element. The oscillator frequency is thus adjusted to different frequency ranges in steps, and the oscillator frequency is then variably controlled in each of such ranges by means of the control element 31 to provide speed range adjustment and control of the system.

As is well known, the bridge circuit shown allows a portion of only one frequency to be effective in the circuit because of the degeneration and phase shift provided. The degenerative or negative feedback voltage provided by the voltage divider circuit comprising the resistor 32 and the resistance of the lamp filaments 24 and 25 is constant for all frequencies that may be present in the output circuit of the amplifier 7.

The positive feedback voltage is provided by the voltage divider comprising the resistors 11 and 12, the resistors 16 and 17 and the effective capacity in circuit therewith, as provided by the capacitors 13—15, and the capacitors 18—20. The voltage across the resistors 16 and 17 in series is in phase with the output voltage of the amplifier 7, if $R_1C_1 = R_2C_2$, where $R_1$ is the combined resistances of the resistors 11 and 12 and $R_2$ is the combined resistances of the resistors 16 and 17. Also the value $C_1$ is equal to the effective capacity in circuit, as provided by the capacitors 13, 14 and 15 and the value $C_2$ is the effective capacity in circuit as provided by the capacitors 18, 19 and 20.

The positive feedback voltage on the grid of the oscillator tube 6 normally slightly exceeds the negative feedback voltage on the cathode, and this positive feedback voltage is of the proper phase to sustain oscillation.

If the amplitude of oscillations tends to increase, the current through the lamps 24 and 25 tends to increase, and as the lamp filaments become hotter, the series resistance increases. Therefore, increased negative feedback voltage is developed across the increased resistance of the lamp filaments, and more degeneration is provided, which reduces the gain of the oscillator tube 6 and thereby holds the output voltage at a nearly constant amplitude.

In the present embodiment of the invention, suitable values for the resistors 12 and 16 may be 1 megohm total resistance, while the resistors 11 and 17 may have a value of 100,000 ohms each. The total capacity for the highest frequency to which the oscillator is responsive is determined by the values of the capacitors in the two networks. It may be assumed that the capacitors 13—15 and 18—20 may have values of the order of .0005 mfd. in the present example. However, any suitable adjustable or variable capacity means may be provided to effect similar change in the output frequency.

While any other oscillator means or variable frequency source of controlling pulses may be provided in connection with a system embodying the invention, the r-c oscillator shown has the advantage that it may produce a wide frequency range of control signals, and the wave shape is substantially a true sine wave. The oscillator has a high degree of frequency stability, and the output amplitude is substantially constant over a relatively wide frequency range, which may be of the order of from 300 to 6,000 cycles per second, for example, depending upon the required speed range in any case.

As hereinbefore noted, the speed controlling signal may be a sine wave, a square wave, or any time variable series of pulses which may be applied to the push-pull power control stage to effect gating or triggering of the D. C. power. The oscillator circuit shown and described may therefore, be taken as representing any variable frequency pulse or signal wave source for establishing the output frequency of the system.

The variable control frequency signal may be taken from the oscillator or other source by any suitable coupling means such as a cathode coupling circuit in connection with the amplifier 7 in the present example. For this purpose, the cathode resistor 40 of the oscillator-amplifier 7 is coupled through a capacitor 41 with a gain-control potentiometer 42 having a variable contact 43. The latter is connected with the control grid circuit 44 of an electronic amplifier tube 45. This tube, like the tubes of the oscillator system may be provided by one-half of a commercial 6SN7-GT tube, as indicated.

The amplifier stage 45 is self-biased by means of the cathode resistor 47, and is coupled through the medium of a suitable low frequency input transformer 48 with a second stage voltage amplifier, here provided by a push-pull connected driver stage 49. This stage comprises a pair of electronic amplifier tubes 50 and 51 connected in push-pull or balanced relation between the input transformer 48 and an output coupling transformer 52. Like the voltage amplifier, this stage is self-biased, as indicated. The amplifier tubes may be of the type known commercially as 6V6-GT tubes for developing a medium power output when required, for the control of two push-pull connected gas triodes 54 and 55 in a power output or control stage 56 with which they are coupled through the transformer 52. Ordinarily, however, voltage amplification alone is sufficient in the driver stage, and a single tube amplifier may be used.

The coupling transformers 48 and 52 may be of any suitable type for stepping up the voltage from the amplifier stage 45 to the driver stage 49, and from the driver stage 49 to the power stage 56. Because of the frequency range of operation, it will be seen that all of the signal conveying circuits may be coupled by suitable audio frequency coupling means and transformers. Such coupling means and transformers are highly developed and are available in any desired ratio to provide any desired voltage change between circuits. The transformer and resistance coupling means shown for inter-stage coupling represents any suitable low or audio frequency coupling means which may be effective in the frequency range below 10,000 cycles per second or the usual audio frequency range for sound amplification.

Considering the power stage 56, the push-pull connected tubes 54 and 55 may be a pair of hot-cathode, gaseous-discharge triodes or other grid-controlled tubes of the thyratron type. The grid electrodes 57 and 58 are connected through grid current limiting resistors 62 with the terminals of the secondary 59 of the inter-stage coupling transformer 52. A center tap 60 on the secondary is connected to a negative bias potential supply lead 61, the connections for which will hereinafter be described. The cathodes or filaments 63 and 64 of the tubes 54 and 55, respectively, are connected in parallel to a pair of cathode or filament heating current supply leads 65, which in turn are connected to the terminals of a cathode heater secondary winding of a heater transformer 67. A center tap 68 for the winding 66 and for the filament heating circuit is connected to a ground lead 69, which is also connected with the ground lead 21 for the power supply system, and grounded to the chassis as indicated at 70.

The anodes 72 and 73 of the tubes 54 and 55, respectively, are connected to the terminal ends of a primary winding 75 of a power output transformer 76 through a balanced anode circuit 81—82. A center tap 77 on the primary winding 75 is connected to an anode potential supply lead 78 in which are connected a series control resistor 79 and a current controlling series choke coil 80. Connected in shunt across the anode circuit 81—82 and substantially across the terminals of the transformer primary 75, is a shunt circuit 83 including a series of fixed capacitors 84 which are arranged to provide a variable capacity across the output anode circuit from anode to anode.

The capacitors are connected in series and by means of a selector switch 85, similar to switches 35 and 36 in the oscillator circuit, the capacitors are further selectively connected to provide three different capacity values across the push-pull output anode circuit although it is obvious that additional capacitors or other variable capacitor means may be provided. The capacitors have values determined by the frequency of operation and by the starting and running or operating condition of the system. For an output frequency of 400 cycles, for example, the effective capacity may be 2 mfds. for starting, and may be as low as .75 mfd. for operating, whereas for an output frequency of 3,000 cycles, for example, .3 mfd. may be effective to start, whereas .1 mfd. may be sufficient to operate. Thus the capacitors 84 may have values, the total overall effect of which is controlled by the switch 85 in a manner to adapt the circuit for proper operation at any output frequency within the range of the oscillator 5. For this purpose, therefore, the switch 85 is connected through mechanical means, indicated by the dotted lines 88 and 89, with the range control operating means 38 for the switches 35 and 36, so that simultaneously with change of oscillator frequency, the frequency response, or as will hereinafter appear, the thyratron quenching action of the anode circuit is changed correspondingly by operation of the switch 85.

As will be seen from an inspection of the circuit, when the switch 85 is in the first position shown, all three capacitors are in series. When the switch is moved to the next position, one capacitor is short-circuited and ineffective in the circuit, and when the switch 85 is moved to the third position, two of the capacitors are short-circuited, leaving one capacitor alone effectively across the anode circuit, thereby progressively to increase the capacity across the anode circuit. Thus the frequency of the oscillator and a condition of operation of the output anode circuit are both changed simultaneously in the same direction by this means which is not limited to fixed step adjustment shown or to any fixed number of steps. Any suitable means for adjusting or varying the capacity across the balanced anode circuit may be used within limits hereinafter pointed out in the description of the operation of the system.

The output transformer 76 is provided with a low impedance secondary winding 92, the terminals of which may be connected with any suitable power utilization means such as a high speed induction motor 93, for example, which may be located remotely therefrom and connected thereto through suitable motor connection leads 94, 95 and 96. The output transformer is shown in connection with an induction motor, as the system is particularly adapted for driving such motors for high speed grinding and the like in various machine tools and equipment, as hereinbefore pointed out.

In the present example, the motor armature is indicated at 97, having a shaft connection indicated by dotted line 98, for connection with an operating tool or grinding wheel 99. The motor is of the split-phase, capacitor type, having two field or operating windings 100 and 101, which are jointly connected with one terminal of the power output transformer secondary through the supply lead 94 and an output lead 102, which also may be grounded to the chassis of the apparatus as indicated at 103.

The operating winding 101 is further connected with the opposite terminal of the power output transformer secondary through the power supply lead 96 and a second output lead 104. The motor winding 100 is also connected with the lead 104 and the opposite terminal of the secondary 92 through the lead 95 and a series capacity means comprising one or more series connected capacitors 106. These capacitors provide the usual phase shift between the operating windings 100 and 101 to operate the motor as a capacitor motor, and the value of the capacity in series with the winding 100 is varied in accordance with the operating frequency applied to the motor from the power supply system.

The adjustment in frequency response is provided by a switch 110 connected with the capacitors 106 to effectively control the number included in series in three steps. The first step, as shown, connects all three capacitors serially in circuit while the second and third steps progressively reduce the number in series. These capacitors may, for example, each have a value of 3 mfd., and the voltage applied to the motor in the present example may be considered to be of the order of 230 volts, although the value of the voltage depends upon the power requirements of the motor and the ratio of the output transformer 76, as well as the capacity of the gas-discharge triodes 54 and 55 to furnish the desired operating current.

In order to stabilize the operation of the power supply system, a shunt load resistor 112 is connected across the secondary or power output circuit between the leads 102 and 104. To correct the power factor of the load, whereby maximum power may be derived, a power factor correction capacitor 114 is likewise connected across the secondary or power output circuit between the leads 102 and 104.

Adjustment of the frequency response of the motor circuit, that is, the phase shift through the capacitors 106 may be made simultaneously with the adjustment of the frequency range of operation of the oscillator and of the anode circuit frequency response by means of an operating connection indicated by the dotted line 115 between the switch 110 and the mechanical connection 88—89 for the power stage switch 85. By this means, simultaneously with the adjustment of the frequency range of the system by means of the manual control element 38, the frequency response of the power output circuit and the output anode circuit is adjusted for proper response in the selected frequency range. Variations of the frequency within that range, by means of the control element 31 for the oscillator, causes the two circuits above mentioned to operate about a mean maximum efficiency point.

Adequate power supply for the power control or output stage 56 is provided by means of a three-phase rectifier system 118, comprising three rectifier tubes 119 supplied with three-phase energy from supply lines 120, through voltage step-down transformers 121 (assuming a 440-volt supply at the source 120) having primary windings delta-connected to the three-phase power supply lines and having the secondaries thereof Y-connected to the rectifiers. The neutral point of the Y-connection is connected to the ground lead 69 and to the chassis or ground 70. The positive high voltage output connection is taken from a center tap on a filament heater secondary winding 122 for the rectifiers 119, this winding forming part of a voltage change transformer 123.

The above high voltage output connection from the filament winding 122 is taken through an output lead 125, through an overload relay winding 126 and the choke coil 80 in series, to the positive anode supply lead 78 hereinbefore described, thus supplying anode current to the anodes 72 and 73 of the thyratrons or power control tubes 54—55 in the power stage. Since the center tap 68 of the filament supply secondary 66 for the output stage is connected to the lead 69, it is likewise connected to the negative side of the power supply circuit at the Y of the secondary connection for the rectifiers 119. Thus the output potential from the three-phase power rectifier is applied through the primary 75 between the anodes and the cathodes of the power stage tubes 54—55.

It will be noted that an output load resistor 127 is connected between the lead 125 and the lead 69, that is, across the output of the three-phase power rectifier as a load resistor, and it will further be noted that no capacitor filtering is required, since the output of the three-phase rectifier system is sufficiently smooth for supplying energy to the load through the power stage circuit, thus materially reducing the cost of manufacture and maintenance of the equipment.

The transformer 67 for energizing the filaments of the inverter stage and the transformer 123 are both energized directly from the three-phase power supply mains, the primary winding 130 of the transformer 67 being connected in parallel with the primary 131 of the transformer 123, across supply leads 132 which are connected with the mains 120 on the output side of a main switch 133 for the system interposed between the lines 120 and the rectifier system above described. With this arrangement, as soon as the main switch 133 is closed, the filaments of the rectifiers 119 and the filaments of the thyratrons or power control tubes 54 and 55 are energized and brought up to temperature before the anode current is applied by energizing the transformers 121.

The transformers 121 are energized through suitable relay type switch means having contacts 135 connected in the three-phase power supply lines 120 to the transformers, and an additional set of contacts 136. These contacts are simultaneously operated by a solenoid winding 137, which is under control of a "start" switch 138 and a "stop" switch 139, and the contacts 140 and 141 of two main overload relays 142, the latter being inserted in the three-phase power supply leads to the transformers 121.

The control circuit for the solenoid 137 may be traced from an operating current supply lead 145 through the contacts 140, the solenoid winding 137 and the relay contacts 141 to a connection lead 146, thence to one contact 147 of the "start" switch 138, through the switch 138 to a contact 148, a lead 149 and the contacts 150 of the overload relay 126 in the rectifier D.-C. power supply system. The circuit then returns from the contacts 150, through a lead 151, to a second operating current supply lead 152.

From the foregoing description, it will be seen that upon operation of the "start" switch 138, the contacts 147 and 148 are closed and the above circuit is completed, with the result that when the leads 152 and 145 are energized, the operating winding or solenoid 137 is energized to close the contacts 135 and 136, thereby applying power to the transformers 121 and to the three-phase rectifier system, and energizing the anode circuit of the power stage containing the power controlling tubes.

Should the three-phase rectifier system overload, the relays 142 operate to open either of the contacts 140 or 141, thereby de-energizing the solenoid winding 137 and causing the contacts 135 to open. The contacts 136 are connected directly across the contacts 147—148 of the "start" switch 138, through the contacts 155 of the "stop" switch 139, which are normally closed as shown. Thus, when the "start" switch button is released, the contacts 136 are then closed, and accordingly the solenoid winding 137 remains energized through the contacts 136.

However, upon opening the contacts 155, by operation of the "stop" switch 139 or by operation of the main overload relay contacts 140 or 141, or by operation of the D. C. power overload relay contacts 150 in the rectifier output circuit, the operating coil 137 will be de-energized, thereby opening the contacts 135 and 136 and de-energizing the power supply to the output stage. Thus the system is fully protected against overload or malfunctioning, and is conveniently arranged to start and stop by push button control, while at the same time the cathodes of the rectifiers and of the power output stage remain energized except when the entire system is de-energized by operation of the main switch 133.

The supply leads 152 and 145, above mentioned, are energized from a secondary winding 157 on the low voltage supply transformer 123 through output leads 158 therefrom, which are connected jointly with the leads 145 and 152 and with the primary winding 159 of a power supply transformer 160 for the plate supply unit 161 which supplies anode and heating current to the oscillator tubes 6 and 7, the voltage amplifier 45, and the driver stage tubes 50 and 51. The plate supply unit 161 is provided with the conventional full wave rectifier tube 162, filter circuit 163 and output bleeder resistor 164. A low voltage tap 165 on the bleeder resistor is connected to ground and chassis 166, and is also connected, through a lead 167, to the main ground lead 21 of the system, being thereby connected also to the ground lead 69 for the power supply unit 118, so that the ground circuits for the control oscillator, amplifiers, power output stage and rectifier system are all connected in common.

The plate supply unit 161 also supplies fixed biasing potential for the output or power control stage 56, and for this purpose, the grid bias potential supply lead 61 is connected to a terminal 168 on the bleeder resistor 164 of the plate supply unit 161 which is at a negative potential with respect to ground. Since the more positive terminal 165 is connected to ground, and therefore to the cathodes 63 and 64 through the secondary winding 66 of the transformer 67, the negative biasing potential existing between the terminals 165 and 168 is applied between the cathodes and the grids of the power stage 56. For the tubes mentioned, in the circuit shown and for the purpose intended, this may be of the order of 45 volts negative. An anode supply lead 169 for the oscillator, voltage amplifier and driver stage is connected to the positive terminal 170 of the plate supply unit 161.

Thus a separate power supply means is provided for the input end of the power supply system or the frequency control and amplifying portion thereof, which aids in preventing interaction between the various units except under control of the oscillator frequency. By this means, also, the power stage biasing potential is not affected by variations in voltage in the three-phase rectifier output circuit for the anodes of the power stage. It will also be seen that the plate supply unit 161 remains energized so long as the main switch 133 is closed. Thus the oscillator and amplifiers are continuously energized to provide a frequency controlling pulse or wave at all times when the system is in operation, whereby the output power may be applied to the motor circuit or be cut off independently and without affecting the operation of the supply system. In accordance with this arrangement, only the anode potential for the power stage is controlled by the relay switch means comprising the solenoid winding 137 and contacts 135 in the main power lines.

With a capacitor type motor as the power utilization means, it has been found desirable to increase the effective capacity in series with the winding in starting the motor, for the reason that it comes up to speed at a higher rate, and likewise it is desirable in starting, to increase the capacity load across the anode circuit for the reason that the motor provides a heavy load or partial short-circuit across the output circuit which is reflected into the anode circuit as will hereinafter be described.

Therefore, the capacity provided by the capacitor elements 106 in the output or motor circuit and the capacity provided by the capacitors 84 across the anode circuit are arranged to be increased on starting, under control of suitable switching means provided by a relay having contacts 175 and 176, connected through leads 177 and 178, respectively, with the capacitors 106 and 84.

The relay contacts 175 and 176 are closed when the operating winding 179 is energized through auxiliary contacts 180 on the "start" switch 138, through which the winding 179 receives energy from the operating potential supply leads 145 and 152. This connection may be traced through circuit leads 181 to the switch contacts 180 and to the supply leads 145 and 152. Thus when the "start" switch 138 is closed, the relay winding 179 is energized, thereby increasing the capacity across each of the circuits referred to by effectively including only one of the capacitors 106 and 84 in said circuits. However, any other suitable control means may be provided in connection with the "start" switch for varying or adjusting the capacity in each of the circuits referred to when starting a motor load. By this means, the capacity load may be greatly reduced in operation and a greater operating efficiency obtained.

It will also be noted that a pilot lamp 184 may be provided in connection with the control elements 138 and 139 to indicate when the system is in readiness for operating the motor or other load. To this end, the pilot lamp 184 is connected through a pair of leads 185 with the current supply circuit 145—152 in the present example.

The operation of the system is as follows:

With the main switch 133 closed, the filaments of the rectifiers 119 in the three-phase power supply circuit 118, and the filaments of the gas-triodes 54 and 55 in the power output stage 56 are energized, together with the plate supply unit 161 and the oscillator, amplifier and driver stages connected therewith. It is also assumed that an A. C. motor load 93 is connected to the power output circuit 102—104.

The oscillator frequency control circuits are adjusted to provide a frequency setting corresponding to the desired initial speed of the motor. To this end, the range control knob 38 and the variable speed control knob 31 are manually adjusted to set up the above condition.

When the cathodes of the rectifiers 119 and the gas-triodes 54—55 have reached the operating temperature, the "start" switch 138 may be operated, whereupon the three-phase power rectifier system 118 is energized, thereby energizing the anode circuit of the power output stage with a D. C. potential. As hereinbefore pointed out, operation of the start switch 138 causes closure of the switch contacts 135 and 136 of the power relay by energizing the operating coil 137. Also as pointed out, this coil may be de-energized to open the switch contacts upon operation of any of the overload relays, or by operation of the "stop" switch 139. When the "start" switch is operated, the capacitor load across the output anode circuit 81—82 and in the motor circuit 102—104 is increased momentarily by operation of the relay coil 179 and closure of the contacts 175 and 176, while the "start" switch button is depressed.

When the motor reaches the initial speed as determined by the oscillator frequency, the speed of the motor may then be adjusted to any desired value by variation of the oscillator frequency by means of the control knobs 31 and 38. Steady operation of the oscillator at all frequencies is adjusted by means of the negative feedback control resistor 32. Proper firing of the gas filled tubes in the power output stage is checked by adjustment of the amplifier gain control element 42, to provide the relatively high signal amplitude required to be applied to the control grids of the power controlling thyratron tubes 54—55 from the oscillator, as will hereinafter be seen.

The oscillator output signal is amplified and applied to the grids of the power controlling tubes 54—55 to produce a 180° difference in voltage between the grids which are connected in push-pull relation, and this signal effectively triggers the D. C. power from the supply source 118 into the output or load circuit 102—104 through the power output transformer 76, at the oscillator frequency. The grids of the power tubes 54—55 are also biased negatively with respect to the cathodes, so that the ignition or firing point is not reached until a signal from the oscillator is applied to the grids.

For a further understanding of the operation of the power output stage, it is desirable to consider the phase relation existing between the anodes of the power controlling tubes 54 and 55, first at the instant of firing of the tube 54, and secondly at the instant of firing of the tube 55.

When the tube 54 fires in response to a positive half-wave control pulse of proper high amplitude applied thereto from the oscillator, instantaneous rising current flows through one-half of the output transformer primary 75 from the center tap 77, through one-half 81 of the balanced anode circuit 81—82 and the low impedance of the tube 54 from the anode 72 to the cathode 63, and thence through the cathode supply circuit 65, the heater winding 66 and the tap 68, to the negative power supply lead 69. The rate of the current increase and its peak value is limited by the impedance of the anode current controlling resistor 79 and the series anode current controlling inductance or reactor 80, as well as the internal resistance of the tube 54.

Through the limiting impedance of the current controlling elements 79 and 80, therefore, one-half of the power output transformer primary 75 is at the moment of firing of the tube 54, connected effectively across the full voltage output of the D. C. power supply, and a half wave of output power is generated in the secondary 92 and delivered to the output circuit 102—104 and the connected motor load as a result of the sharply rising, relatively heavy current flow in the half of the primary which is connected to the fired tube 54.

Another current path from the center-tap 77 to the anode 72 is provided through the other half of the output primary 75 from the center tap 77 to the opposite end and to the capacitor circuit through the other half 82 of the balanced anode circuit, thence through the capacity effectively in circuit from anode to anode, as provided by the capacitors 84 which may be in circuit at that time. The return path from the capacitors 84 for the charging current is then through the fired tube 54 to the negative lead 69 of the power supply as in the case of the power current above, and in the same direction. This charging current serves to charge the effective capacity at 84 across the anode circuit 81—82, and produces a certain opposing flux in the output transformer, which causes the primary impedance in series with the tube 54 to become relatively low at the instant of firing of said tube. However, the resistance of the series anode current controlling resistor 79 and the impedance of the choke coil 80 are such that they effectively limit the current during the charging cycle of the capacitors 84 which may be in circuit depending upon the frequency adjustment, to a value within the current carrying capacity of the tube 54. The inductance of the choke coil is particularly effective in the circuit because of the steep wave front of the current rise in the anode current supply circuit 78 under the above condition. A resistor such as 79 in the connection to the center tap of the transformer primary is of great importance also, since by its use the life of the tubes 54 and 55 may be greatly lengthened and continuous operation of the system for long periods is made possible.

The effective power current through one-half of the primary winding from the center tap 77 to the anode of the tube 54 inductively produces a potential from anode to anode, that is, across the entire primary, which is at least double that across one-half of the primary from the center tap to the anode of the tube 54. Assuming a potential drop across the fired tube 54 of 10 volts, and an additional potential drop through the anode current controlling resistor and choke coil of an additional 10 volts, then with an initial supply voltage available at the power supply across the terminals of the load resistor 127 of 175 volts, the peak voltage from the center tap of the output transformer primary to the anode of the tube 54 is then substantially 155 volts. The potential from anode to anode, or across the entire primary, is then at least double that amount, or 310 volts, which represents the potential to which the capacity provided by the capacitors 84 will be charged, the end toward the anode circuit lead 82 being positive at that time and the end toward the anode circuit lead 81 being negative.

With the proper value of capacity across the output anode circuit with respect to the controlling frequency, at the instant when the charge on the effective capacitors 84 approaches maximum, the alternating potential applied to the grids of the output or power control tubes 54 and 55 completes its reversal, and the grid of the other power control tube 55 is then driven to its firing potential in a positive direction while the grid of the tube 54 becomes negative with respect to cathode.

When the tube 55 fires, the instantaneous potential charge of at least 310 volts positive on the shunt controlling capacitors at 84 as effectively in circuit, is suddenly applied to the cathode of the tube 54 through the now low resistance of the tube 55, as in inverse potential, and the reverse current resulting therefrom through the tube 54 which is still in a fired condition and conducting, is of short duration and only sufficiently long in time to de-ionize the tube 54. The remainder of the charge flows through the primary to discharge the capacitor effectively across the circuit.

It will be seen that under the above condition, the tube 54 is instantly de-ionized by the relatively high inverse potential from the controlling capacity at 84. This action is enhanced for the reason that at the instant of discharge, the cathode 63 is at a positive potential of 330 volts, while the anode 72 is simultaneously positive by 175 volts or less. Thus the anode is substantially 155 volts, or more, negative with respect to the cathode, and as the grid 57 is then negative by reason of the reverse cycle of the controlling signal from the oscillator, the tube instantly de-ionizes. Thus by applying a high inverse potential to the tube 54, the de-ionization time is only a fraction of that which would exist if the anode circuit were merely opened, and triggering of the power at relatively high frequencies far beyond the rated capacity of the tubes 54 and 55 is attained.

The instant the tube 54 de-ionizes, the control capacity at 84 recharges in the opposite direction as charging current flows from the positive supply lead 78 through the then inactive half of the primary 75 which is connected with the tube 54. The charging current flows from the center tap 77 to the anode circuit lead 81, thence through the capacitors 84 and back to the negative side of the power source 69 through the capacitor circuit 83, the opposite side of the anode circuit 82, the low impedance of the newly fired tube 55 and the cathode supply circuit therefor as before. The charge in the opposite direction is at least double the voltage across the other half of the primary, or of the order of 310 volts or higher as in the case of the initial charge, and results from the heavy power flow of current through the fired tube 55 and its half of the primary 75, from the center tap 77 to the anode circuit 82 and the anode 73. This power wave is limited, as before, by the controlling impedance of the series resistor 79 and choke coil 80 in the positive power supply lead 78, and provides the alternate half wave of power induced into the output secondary 92 and the motor load at 93 through the output circuit 102—104 and the motor leads 94—95—96.

As the potential on the grids 57 and 58 again reverses in polarity, the tube 54 again fires as its grid reaches the firing potential in the positive direction, and the cycle above described repeats, at the frequency determined by the controlling pulse or wave delivered to the power stage by the oscillator or other controlling frequency source.

Alternate heavy power surges are thereby applied to the primary of the power output transformer under control of the oscillator frequency, the power control tubes 54 and 55 operating in push-pull relation to provide alternating current power in the output secondary 92 and the load circuit.

The capacity across the anode circuit established by the capacitors 84 thus provides an effective control or commutating capacity from anode to anode, which insures extremely rapid de-ionization of the tubes alternately, and is adjusted to such value that it merely performs this function without overloading the circuit, that is, the capacity is maintained at a minimum value consistent with effective de-ionization. A very high positive grid voltage swing is required to fire each tube under this condition of operation. Accordingly a strong triggering or frequency control signal from the oscillator is provided through the amplifying means including the driver stage, and is adjusted to the desired amplitude by the gain control potentiometer 42—43 in the input circuit of the voltage amplifier 45.

The firing and extinction alternately of one power control tube and then the other, continues as long as a control signal is applied to the power stage from the oscillator. If the oscillator suddenly ceases operating, or if the oscillator signal strength falls to a relatively low value, it results in one of the power control tubes remaining in a fired or conducting condition, since it is the firing of the other tube which extinguishes the one. Once the alternate firing or triggering of the power control tubes has been initiated, the extinction of both tubes simultaneously can only be accomplished by opening both anode circuit leads 81 and 82 simultaneously or by cutting of the power supply.

Since the steady-state current of one of the power control tubes 54—55 which is conducting, is higher than the normal value of the firing current which is reached in normal operation, the anode current will tend to rise until it is high enough to trip the overload relay 126—150 and cut off the power, thus providing a safety feature in case of failure of the controlling frequency. For the power control tubes referred to, the steady state current may be greater than 40 amperes, assuming a tube drop in potential of 10 volts, and a series resistance of 4 ohms in the resistor 79, including the resistance of the choke coil 80, with a supply voltage of 175 volts.

This current may be approached instantaneously during operation, but for only a small part of a cycle and not long enough to trip the overload relay. The capacity across the balanced anode circuit is thus coordinated with the control frequency to extinguish each power control tube before it reaches the above or similar peak current value. The function of the control or commutating capacitors 84 effective across the anode circuit of the power stage is to store sufficient charge to cause a complete reversal of the anode potential of the tube which is then just completing its firing cycle, thereby to produce rapid extinction or de-ionization, without drawing excessive current and causing heating of the control capacitor or capacitors.

The relatively high reversal of potential or inverse potential on the power control tubes during each cycle, thus raises the firing potential required on the grids, and therefore a higher driving or control voltage is required to sustain high frequency alternate firing of the power control tubes than would be indicated by their static tube characteristics. Thus the gain control means 42—43 for the control voltage is sufficiently advanced to secure a strong input signal on the power control tube grids.

Again it may be pointed out that the value of the capacitor, or effective capacity, across the anode circuit of the power stage must be only sufficiently large to provide complete and instantaneous de-ionization of the power control tubes at the end of each firing cycle, but not sufficiently large to cause a loss of energy in the output transformer at the initiation of each firing cycle. Thus any additional capacity required to correct the power factor of the motor is placed across the secondary, as indicated by the capacity 114 in the power output circuit 102 and 104, without affecting the firing action of the tubes in the power stage.

The choke coil 80 suppresses the steep wavefront of current on each firing cycle and maintains the average value of the anode current below the safe current limit for the particular tubes used. In addition, the anode current controlling resistor 79 limits the current rise after each tube has fired, so that at no time in the operation, with the oscillator frequency applied, may the anode current of the power control tubes reach the full, normal, steady state value, before de-ionization occurs.

From the foregoing description, however, it will be seen that in the alternate firing and quenching action of each tube, both tubes are momentarily in a fired or conducting condition during the instant the quenching charge is delivered on the cathode of the tube which is terminating its firing cycle. Thus at that instant, current flows from the center tap 77 of the output transformer in opposite directions through both halves of the primary 75, the inductance effect of the primary and in the anode circuit momentarily becomes substantially zero. Thus the instantaneous current flow from the direct current power supply circuit through the lead 78 is under substantially short circuit conditions and a peak current tends to flow. The serious impedance means, however, comprising the resistor 79 and the choke coil 80, are effective to limit the peak current to a value within the current carrying capacity of the tubes, and does not prevent the normal power output from being attained with one or the other of the tubes drawing current on each half wave.

The inverse or de-ionization potential applied to each power control tube through the other tube, from the control or commutating capacitor arrangement may become relatively high or exceed safe limits, without an additional fixed resistance load across the output circuit, as provided by the resistor 112. This is particularly true with the motor in operation without load or with no appreciable load. The steep wave front of the current through the primary as each power tube fires causes this condition of overquenching.

The commutating or controlling capacity across the power stage anode circuit, as provided by the capacitors 84 is the source of the quenching inverse potential applied to the power tubes on the alternate half waves of the controlling frequency signal and must be increased above the normal running value when the load is exceedingly heavy, particularly as when starting a motor load. Before the motor starts and as it comes up to speed, it is a partial short circuit on the load circuit which gradually reduces as the motor reaches full speed. This load is reflected into the anode circuit and tends to reduce the effectiveness of the capacity arrangement to provide sufficient de-ionizing or inverse potential to overcome the supply voltage on each cycle. Therefore, means as shown and described hereinbefore, are provided for increasing the control or commutating capacity when starting, to maintain the proper inverse de-ionizing potential on the tubes until the motor reaches normal speed.

As indicated hereinbefore, for a motor operating speed of 180,000 R. P. M. corresponding to a control or triggering frequency of 3,000 cycles per second from the oscillator, the value of the controlling or quenching capacitor across the output anode circuit may be of the order of .3 mfd. during starting of the motor, being reduced to .1 mfd. for normal operation after the motor attains operating speed. For a motor operating speed of 24,000 R. P. M. corresponding to a control or triggering frequency of 400 cycles per second from the oscillator, a capacity of 2 mfd. may be required during the starting operation and a capacity of .75 mfd. for normal operation, with a circuit as shown.

In the power output circuit, the effective capacity provided by capacitors 106 in series with the motor, may likewise be changed for starting the motor, a value of 1.5 mfd. being suitable for starting the motor, in certain applications, and with a value of .75 mfd. for normal operation. The power factor correction capacitor 114 may likewise be adjusted in accordance with the frequency of the current supplied to the motor. In starting, this capacitor may have a value of the order of 10 mfd. in certain applications and a running capacity of the order of 5 mfd. for the lower speed range above referred to. While no controlling switch has been shown in connection with this capacitor, for the sake of simplifying the circuit, it may be provided in the same manner as for the other switch means for making capacity adjustments with frequency change of the oscillator output signal.

The primary of the output transformer develops a much higher voltage than would be the case if resistors were substituted for the two halves of the push-pull primary 75 of the output transformer. This voltage increase is the result of the inductive condition of the transformer primary and the high instantaneous current when the firing of each of the tubes is initiated.

From the foregoing consideration of the present embodiment of the invention, it will be seen that an improved variable frequency power supply system in accordance with the invention is adapted to meet relatively heavy load conditions wholly through electronic tube means, thereby obviating the use of rotating power supply equipment and the speed limitations thereof, and provides an output frequency which is variable over any desired range representing any desired range of operating speeds in connection with alternating current motors, particularly of the induction type, for various industrial power applications at variable speeds.

A variable frequency power supply system for high speed industrial motor applications and the like in accordance with the invention, has the further advantage that electronic tube means in a minimum number of simplified circuits are required in its construction. The balanced power output stage provides maximum power handling ability and a full frequency range of response corresponding to the widest speed range that can presently be used or contemplated for industrial purposes and permits full advantage to be taken of gaseous discharge tube power handling capabilities throughout such frequency range, without the limitations ordinarily imposed by previous concepts of de-ionizing time.

The above mentioned balanced power output stage includes a pair of push-pull connected electronic power control tubes of the character referred to and which are pulsed or triggered for altenate operation as electonic switches at frequencies corresponding to any desired speed, and operate to provide alternating flow of D. C. current, from a suitable source, in the primary of a power output transformer which is coupled to the load, and thereby provides an A. C. power output at the predetermined frequency. The tubes are rendered alternately conducting in response to the application thereto of a triggering pulse wave from a suitable variable frequency source, and are self-quenching alternately in response to controlling capacitor means connected across the output transformer primary, whereby a relatively high inverse potential is applied to each tube, through the other, at the end of its conducting or firing cycle sufficient to de-ionize it in phase with the negative alternations of the triggering pulse wave. The system is operative at a frequency rate which may be infinitely higher than has been considered normal for the particular tubes used, such as thyratrons.

While a power supply system embodying the invention is particularly adapted to provide an efficient high speed motor drive for various industrial purposes and is adapted to provide flexibility in speed control in an extended ultra high-speed range, it is obvious that it is not limited to such applications but may be adapted for other uses requiring variable frequency alternating current power both within and above the frequency range to which rotating alternating current power supply means are inherently limited.

I claim:

1. A variable frequency power supply system comprising in combination, a variable frequency pulse source, a power controlling electron tube circuit including a pair of gaseous-discharge electron power tubes each having an anode electrode, signal amplifier means coupling said tubes in push-pull relation to each other with said variable frequency pulse source, a power output transformer for said system having a primary winding connected between said anode electrodes and having a center-tap, a direct current power supply circuit having a positive supply lead connected with said center tap, current limiting resistance means in said power supply lead for limiting the peak current flow through said tubes and said primary winding, and controlling capacitor means connected between said anode electrodes across said primary winding to provide an inverse quenching potential for each of said tubes substantially at the termination of its conducting period at the frequency of operation.

2. A variable frequency power supply system comprising in combination, a variable frequency pulse source, a power controlling electron tube circuit including a pair of gaseous-discharge electron power tubes each having an anode electrode, signal amplifier means coupling said tubes in push-pull relation to each other with said variable frequency pulse source, a power output transformer for said system having a primary winding connected between said anode electrodes and having a center-tap, a direct current power supply circuit having a positive supply lead connected with said center tap, current limiting resistance means in said power suply lead for limiting the peak current flow through said tubes and said primary winding, and controlling capacitor means connected between said anode electrodes across said primary winding having an adjustable capacity value, thereby to provide an inverse quenching potential for each of said tubes substantially at the termination of its conducting period at the frequency of operation.

3. A variable frequency power supply system in accordance with claim 2, wherein the pulse rate of said variable frequency pulse source is varied simultaneously with the controlling capacity value across the primary winding, whereby the quenching action of said capacitor means on said tubes is maintained in predetermined time-phase relation with the alternate pulsing of said tubes.

4. A variable-frequency-power-supply system for high speed industrial motor applications and the like, comprising in combination, a signal amplifying circuit, a balanced power output amplifier stage coupled thereto and including a pair of push-pull-connected electronic power-control tubes of the grid-controlled, gaseous-discharge type, a variable frequency pulse source coupled to said amplifying circuit for applying triggering pulses to said tubes for alternate operation as electronic switches at frequencies corresponding to any desired high speed, a power output transformer having a primary winding provided with a center-tap, said transformer being connected with said tubes as a balanced power output coupling device therefor, a source of direct current power having a positive supply lead connected with the center-tap of said primary winding and including a series current limiting resistance element therein, said tubes being alternately conducting in response to the application thereto of a triggering pulse wave from said variable frequency pulse source, controlling capacitor means connected across the output transformer primary and adjustable in capacity values for receiving a charging potential therefrom and for applying said potential as a relatively high inverse potential to each tube through the other at the end of its conducting cycle sufficient to de-ionize it in phase with the negative alternations of the triggering pulse wave thereon, whereby the system is operative at frequency rates which are higher than normal for gaseous-discharge grid-controlled tubes.

5. A variable-frequency power-supply system comprising in combination, a variable frequency signal amplifier terminating in a balanced power amplifier control stage including a pair of push-pull connected grid-controlled, gaseous-discharge electron tubes, a balanced output anode circuit for said stage including an output transformer having a center tapped primary winding, a direct current power supply circuit for said stage having a positive lead connected with the center tap of said primary winding and including a series current limiting resistance element having a value for limiting the peak anode current flow from said supply circuit to said output stage within the normal operating capabilities of said tubes, frequency varying means for said signal amplifier for applying alternate positive and negative half wave pulses to said tubes to cause alternate firing and conduction thereof at different operating frequencies, adjustable quenching capacitor means connected across said primary winding, a secondary winding coupled to said primary winding, an alternating current power output circuit connected with said secondary winding, a motor supply circuit coupled to said output circuit, means including a capacitor for varying the frequency response of said motor supply circuit in accordance with variations in capacity in said quenching capacitor means and in the pulse rate from said frequency varying means in predetermined relation thereto, and switch means for momentarily increasing the capacity of said quenching capacitor means and adjusting the frequency response characteristic of the motor supply circuit to maintain a predetermined power output in starting motor loads and the like.

6. In a variable-frequency power-supply system, the combination with a pair of gaseous-discharge electron tubes, each having a control grid and anode and cathode electrodes, of a source of positive and negative half-wave triggering voltage pulses coupled to the control grids of said tubes in push-pull relation to provide alternate firing and conduction through said tubes at a predetermined variable rate, a power output transformer having a primary winding connected between said anode electrodes and having a center-tap thereon, a quenching potential supply circuit connected with the anode circuit of said tubes across said primary winding, variable capacitor means in said quenching potential supply circuit for receiving a charge across said primary winding alternately in response to alternate firing of said tubes at the frequency rate of said pulses, thereby to provide an inverse quenching potential alternately on the cathodes of said tubes in predetermined time-phase relation to the triggering pulses on said control grids, whereby a predetermined rapid quenching of the tubes upon completion of a firing cycle is attained at different frequencies, a direct current power supply circuit connected between the cathode electrodes of said tubes and the center-tap on said primary winding, peak current limiting resistance and inductance means in said direct current supply circuit, means for simultaneously varying the pulse rate of said pulse source and the capacity of said quenching potential supply circuit in predetermined relation to each other to control the firing rate of said tubes and the power output frequency through a relatively wide frequency range, a secondary winding coupled to said primary winding, an alternating current power output circuit connected with said secondary winding, a motor supply circuit coupled to said output circuit, means including a capacitor for varying the frequency response of said motor supply circuit in accordance with variations in capacity in said quenching potential supply circuit and in the pulse rate from said pulse source in predetermined relation thereto, start and stop switch means and a power rectifier circuit controlled thereby for energizing and de-energizing said direct current power supply circuit, and switch means operable in response to operation of the start switch means for momentarily increasing the capacity in said quenching potential supply circuit and in the motor supply circuit to maintain a predetermined power output in starting motor loads and the like.

7. A variable-speed power-supply system for high speed induction motors and the like, comprising in combination, a variable frequency oscillator having a variable control element for adjusting the frequency response thereof over a relatively wide frequency range corresponding to a predetermined desired speed variation range for a motor load, variable-gain amplifier means for the voltage output of said oscillator including at least one signal amplifier stage, a pair of grid-controlled gaseous-discharge amplifier tubes coupled in push-pull relation to said last named amplifier stage for receiving therefrom a high potential triggering wave corresponding to the variable frequency voltage output of the oscillator, whereby said tubes are alternately fired and the impedance of the space-paths thereof are alternately reduced substantially to zero corresponding to each positive half wave of the triggering frequency, a power output transformer having a primary winding and a secondary winding, said primary winding being connected between said tubes as a balanced anode circuit output coupling element for said secondary winding and having a center-tap, a direct current power circuit having a positive lead connected to said center-tap and having a negative lead connected to the terminals of said primary winding in parallel through each of said tube space-paths, whereby in operation direct-current power therefrom is caused to traverse said primary winding in opposite directions from said center-tap alternately at the triggering frequency of said tubes, series peak current limiting impedance means including resistance and inductance elements in said positive lead, adjustable quenching capacity means connected across said primary winding for alternately quenching said tubes at different frequencies in predetermined time-phase relation with the triggering potential applied to said tubes, whereby effective and rapid quenching action is attained in said output circuit at all frequencies, and an alternating current motor supply circuit connected with said secondary winding for receiving alternating current power therefrom at a variable frequency, the frequency response of the motor supply circuit and the quenching capacity across the primary winding being simultaneously variable in response to variations of the variable frequency oscillator.

8. A variable-speed power-supply system for high speed induction motors and the like, comprising in combination, a variable frequency oscillator having a variable control element for adjusting the frequency response thereof over a relatively wide frequency range corresponding to a predetermined desired speed variation range for a motor load, variable-gain amplifier means for the voltage output of said oscillator including at least one signal amplifier stage, a pair of grid-controlled gaseous-discharge amplifier tubes coupled in push-pull relation to said last named amplifier stage for receiving therefrom a high potential triggering wave corresponding to the variable frequency voltage output of the oscillator, whereby said tubes are alternately fired and the impedance of the space-paths thereof are alternately reduced substantially to zero corresponding to each positive half wave of the triggering frequency, a power output transformer having a primary winding and a secondary winding, said primary winding being connected between said tubes as a balanced anode circuit output coupling element for said secondary winding and having a center-tap, direct current power circuit having a positive lead connected to said center-tap and having a negative lead connected to the terminals of said primary winding in parallel through each of said tube space-paths, whereby in operation direct-current power therefrom is caused to traverse said primary winding in opposite directions from said center-tap alternately at the triggering frequency of said tubes, series peak current limiting impedance means including resistance and inductance elements in said positive lead, adjustable quenching capacity means connected across said primary winding for alternately quenching said tubes at different frequencies in predetermined time-phase relation with the triggering potential applied to said tubes, whereby effective and rapid quenching action is attained in said output circuit at all frequencies, an alternating current motor supply circuit connected with said secondary winding for receiving alternating current power therefrom at a variable frequency, the motor circuit being energized in response to energizing said direct current power supply circuit and including capacity means for controlling the frequency response and loading effect of the circuit, and means for momentarily increasing the quenching capacity across the primary winding and the capacity in the motor supply circuit in response to the initial energizing of the motor supply circuit.

9. A variable-frequency power-supply system for high speed alternating current motors and the like, comprising in combination, a variable frequency oscillator having a variable frequency control element manually operable as a speed control means, a pair of push-pull connected grid-controlled gaseous-discharge electron tubes coupled to said oscillator for receiving triggering pulses therefrom whereby said tubes are alternately fired to reduce the anode-cathode impedance thereof substantially to zero as electronic switching means, power output transformer means having winding portions connected with the anode-cathode impedance of said tubes for controlling power current therethrough alternately in response to the alternate firing of said tubes under control of said triggering pulses, a source of relatively high direct current biasing potential for said tubes, a separate source of direct current power for said output transformer means to provide operating current therefor through said tubes, said direct current power source having a series peak current limiting resistance and inductance elements, said output transformer means including an alternating current power therethrough, a high speed motor load circuit connected with said output winding, and a quenching potential supply source for said tubes comprising adjustable capacity means connected between said tubes for receiving a charging current across said first named transformer winding portions and for discharging an amplified quenching potential on the cathode elements of said tubes alternately in time-phase relation with the triggering and firing thereof at all frequencies, thereby to enchance the quenching action and the frequency response of said system in predetermined high frequency operating ranges, said capacity means in the quenching potential supply source being adjusted in accordance with variations in oscillator frequency and speed adjustment, and said capacity means being further increased in response to energizing the direct current power source and the motor supply circuit, for effecting rapid starting of a motor load in connection with said system.

WILLIS F. MOORE.

REFERENCES CITED

The following references are of record in the file of this patent:

UNITED STATES PATENTS

| Number | Name | Date |
|---|---|---|
| 1,839,864 | Breisky | Jan. 5, 1832 |
| 1,889,595 | DeWalt | Nov. 29, 1932 |
| 1,947,093 | Knowles | Feb. 13, 1934 |
| 1,961,057 | Livingston | May 29, 1934 |
| 1,965,416 | Howard | July 3, 1934 |
| 1,967,896 | Morack | July 24, 1934 |
| 2,070,446 | Mittag | Feb. 9, 1937 |
| 2,070,462 | White | Feb. 9, 1937 |
| 2,086,614 | Grandstaff | July 13, 1937 |
| 2,098,041 | Hoppe | Nov. 2, 1937 |
| 2,260,122 | Moore | Oct. 21, 1941 |
| 2,305,581 | Homrighous | Dec. 15, 1942 |
| 2,364,644 | Mott et al. | Dec. 12, 1944 |